(12) United States Patent
Legler et al.

(10) Patent No.: US 8,511,742 B2
(45) Date of Patent: Aug. 20, 2013

(54) AUTOMOBILE COMPONENT MADE OF PLASTIC

(75) Inventors: Dirk Legler, Weil (DE); Jan Woköck, Bad Aibling (DE); Adam Wagner, Germering (DE); Thomas Peter, Ambach (DE); Michael Kölbl, Neuried (DE); Thomas Stemmer, Munich (DE); Petra Heuser, Munich (DE); Detlev Mies, Elsdorf (DE); Hans-Jürgen Liebig, Leverkusen (DE)

(73) Assignee: Webasto AG, Stockdorf (DE)

( * ) Notice: Subject to any disclaimer, the term of this patent is extended or adjusted under 35 U.S.C. 154(b) by 11 days.

(21) Appl. No.: 12/994,613

(22) PCT Filed: Jul. 6, 2009

(86) PCT No.: PCT/EP2009/004881
§ 371 (c)(1),
(2), (4) Date: Dec. 30, 2010

(87) PCT Pub. No.: WO2010/006718
PCT Pub. Date: Jan. 21, 2010

(65) Prior Publication Data
US 2011/0101731 A1 May 5, 2011

(30) Foreign Application Priority Data
Jul. 18, 2008 (DE) .......................... 10 2008 033 923

(51) Int. Cl.
*B62D 29/04* (2006.01)
(52) U.S. Cl.
USPC ....................................... 296/181.2

(58) Field of Classification Search
USPC ............. 296/181.2, 98, 99.1, 100.18, 100.04, 296/107.04, 136.05, 13.06, 901.01, 107.8, 296/136.06, 124
See application file for complete search history.

(56) References Cited

U.S. PATENT DOCUMENTS

| | | | | |
|---|---|---|---|---|
| 5,016,425 A | * | 5/1991 | Weick | 53/453 |
| 6,375,249 B1 | * | 4/2002 | Stanton et al. | 296/178 |
| 6,499,797 B1 | * | 12/2002 | Bohm et al. | 296/191 |
| 7,128,365 B2 | * | 10/2006 | Kiesewetter et al. | 296/191 |

(Continued)

FOREIGN PATENT DOCUMENTS

| | | |
|---|---|---|
| DE | 000001943008 A | 3/1971 |
| DE | 000002755970 A1 | 6/1979 |

(Continued)

OTHER PUBLICATIONS

International Search Report dated Aug. 28, 2009.

*Primary Examiner* — Glenn Dayoan
*Assistant Examiner* — Sunsurraye Westbrook
(74) *Attorney, Agent, or Firm* — Fitch Even Tabin & Flannery, LLP

(57) ABSTRACT

The invention relates to a vehicle component made of plastic, in particular a vehicle body shell component, with at least one supporting layer, with at least one outer skin and with at least one tear-resistant splinter protection layer. According to the invention, the splinter protection layer is formed as a splinter protection fabric and is embedded in the at least one supporting layer, in particular in the edge region thereof, or between two adjacent layers. The splinter protection fabric has the effect of avoiding sharp-edged breaks of the vehicle component in an accident.

8 Claims, 2 Drawing Sheets

(56) References Cited

U.S. PATENT DOCUMENTS

| | | | |
|---|---|---|---|
| 8,042,864 B2* | 10/2011 | Schleiermacher et al. | 296/210 |
| 2004/0217044 A1* | 11/2004 | Gill et al. | 210/232 |
| 2009/0115219 A1* | 5/2009 | Armbruster et al. | 296/128 |

FOREIGN PATENT DOCUMENTS

| | | |
|---|---|---|
| DE | 000019717271 A1 | 11/1997 |
| DE | 000010041640 A1 | 3/2002 |
| DE | 10244287 A1 | 4/2004 |

\* cited by examiner

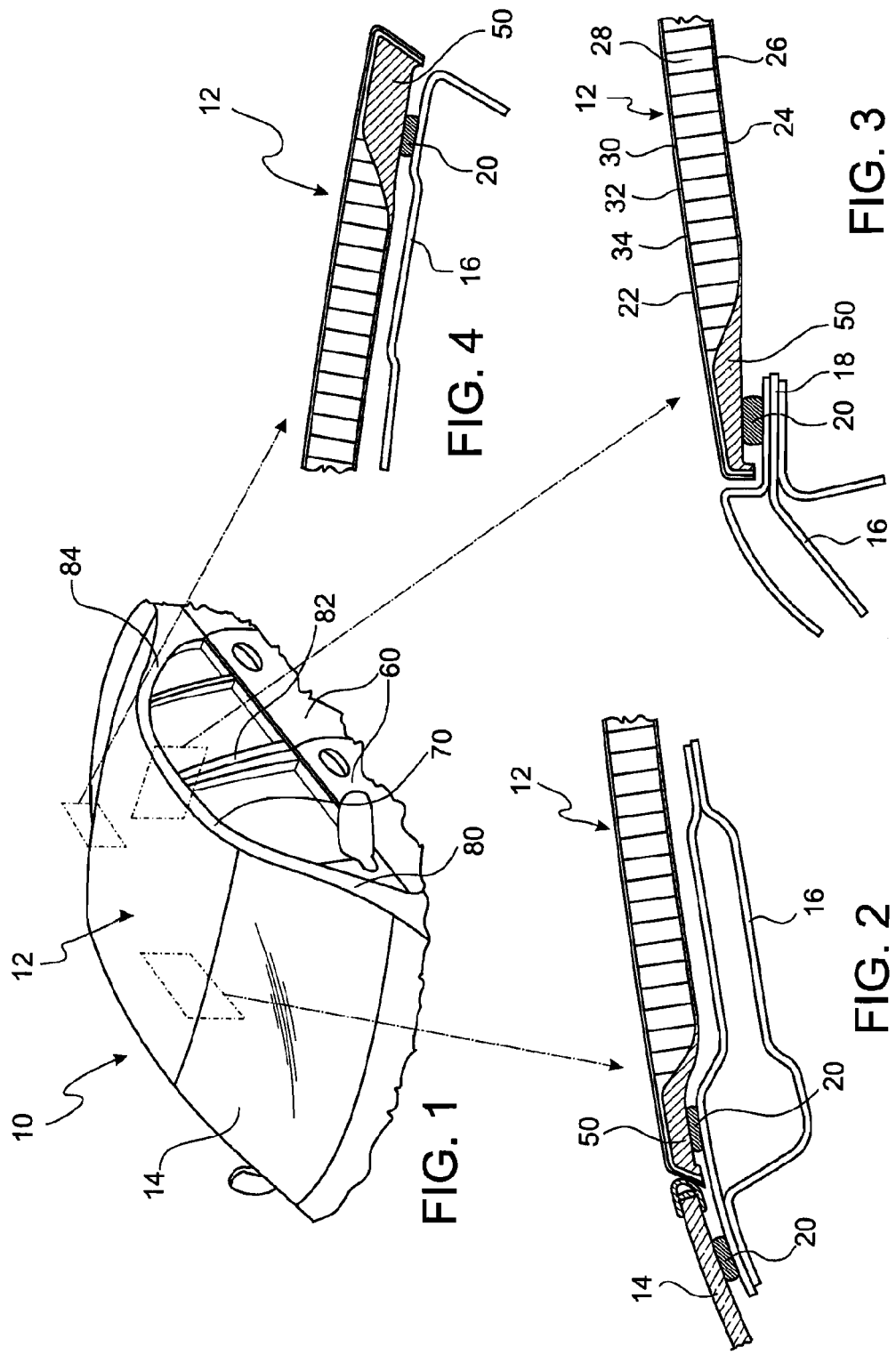

AUTOMOBILE COMPONENT MADE OF PLASTIC

CROSS-REFERENCE TO RELATED APPLICATIONS

This Application is a U.S. national phase application filed under 35 U.S.C. §371 of International Application No. PCT/EP2009/004881, filed Jul. 6, 2009, designating the United States, which claims priority from German Patent Application No.: DE 10 2008 033 923.7, filed Jul. 18, 2008, which are hereby incorporated herein by reference in their entirety for all purposes.

The invention relates to a vehicle component made of plastic according to the preamble of patent claim 1.

Exterior components of vehicles have until now predominantly been produced from metal (steel sheet or aluminum). In an accident, these materials deform in a yielding manner. Recently, exterior components of vehicles have also been increasingly produced from plastics. These components predominantly consist of polyurethane (PU), which in a collision breaks and, with its sharp broken edges, represents an increased risk of injury for those involved in the accident. To remedy this, for example, wings of the VW Touareg have already been provided with splinter protection films applied subsequently to the inner side.

DE 102 44 287 A1 discloses a composite component for a vehicle, comprising an outer skin in the form of a film and a supporting reinforcing layer, which is made up of a honeycomb structure and a polyurethane layer respectively covering said structure on both sides and reinforced with glass fibers. The breaking of such a composite component also produces sharp broken edges with an increased risk of injury.

The invention is based on the object of providing a vehicle component made of plastic with which no sharp edges are produced even in the event of breaking.

This object is achieved according to the invention by the features of patent claim 1. Advantageous refinements of the invention are specified in the subclaims.

The invention essentially provides that a splinter protection layer is formed as a splinter protection fabric of an elastic material and is embedded in at least one supporting layer, preferably in the edge region thereof, or between two adjacent supporting layers. By being formed as a splinter protection fabric, it has intermediate spaces between the individual loops of the weave of the fabric, through which the plastics material of the adjacent supporting layers penetrates. The splinter protection fabric of elastic material thereby bonds the brittle supporting layers to it and prevents the formation of sharp broken edges. In an accident, a vehicle component that is constructed according to the invention will consequently only have harmless cracks, but not sharp-edged breaks.

According to an advantageous refinement of the invention, the at least one supporting layer consists of polyurethane (PU) and/or of a honeycomb layer and/or of a glass fiber mat and/or of a decoupling layer. As an alternative to this, the supporting layer may also consist of a plastics foam or metal foam or of a compact, lightweight and stable core material.

According to a particularly preferred embodiment, the at least one supporting layer or at least one of a number of supporting layers is produced by the composite spray molding process (CSM process) and/or by the long fiber injection process (LFI process) and/or by the glass fiber mat polyurethane process (GM-PU process) and/or by the resin transfer molding process (RTM process) and/or by the sheet molding compound process (SMC process) and/or by the reaction injection molding process (RIM process) and/or by the reinforced reaction injection molding process (RRIM process) and/or by the injection molding process.

The at least one splinter protection fabric preferably consists of polyethylene (PE) and/or of polyethylene terephthalate (PET) and/or of polyamide (PA) and/or of polypropylene (PP) and/or of aramid and/or of elastic polyurethane (PU) and/or of natural or synthetic rubber and/or of a steel mesh.

In the case of a preferred embodiment, the supporting layers of the vehicle component consist in succession, from the inside outward, of a first layer of polyurethane (PU) or of some other thermoset, of a core layer created by honeycomb technology, of a second layer of polyurethane (PU) or of some other thermoset, of a decoupling layer and of an outer skin, at least one splinter protection fabric being arranged between the first layer of polyurethane (PU) or of some other thermoset and the core layer and/or between the second layer of polyurethane (PU) or of some other thermoset and the core layer and/or between the second layer of polyurethane (PU) and the decoupling layer.

In the case of all the embodiments, it is advantageous if a glass fiber mat is embedded as reinforcement in at least one of the supporting layers of polyurethane. As a result, the strength of the overall structure is increased significantly.

It is similarly advantageous in the case of all the embodiments if the outer skin forming the outer termination of the vehicle component consists of a layer of plastic that is already colored in the desired vehicle color at the suppliers. This allows the vehicle manufacturer to dispense entirely with subsequent painting work.

The invention is suitable for all vehicle components made of plastic, but in particular for vehicle body shell components, such as vehicle roof modules, roof posts, A, B, C or D pillars of vehicles, vehicle doors, wings, engine compartment covers, luggage compartment covers, rear-end modules, roof shells of cabriolet hoods, front or rear spoilers.

A vehicle component according to the invention is explained in more detail below on the basis of several exemplary embodiments with reference to the drawing, in which:

FIG. 1 shows a perspective view of an upper part of a vehicle with a vehicle roof module;

FIG. 2 shows a longitudinal section at the level of the central longitudinal plane of the vehicle in the region of the front edge of the roof module;

FIG. 3 shows a cross section through the edge of the roof module in the region of a side post;

FIG. 4 shows a longitudinal section at the level of the central longitudinal plane of the vehicle in the region of the rear edge of the roof module;

Figure 5:
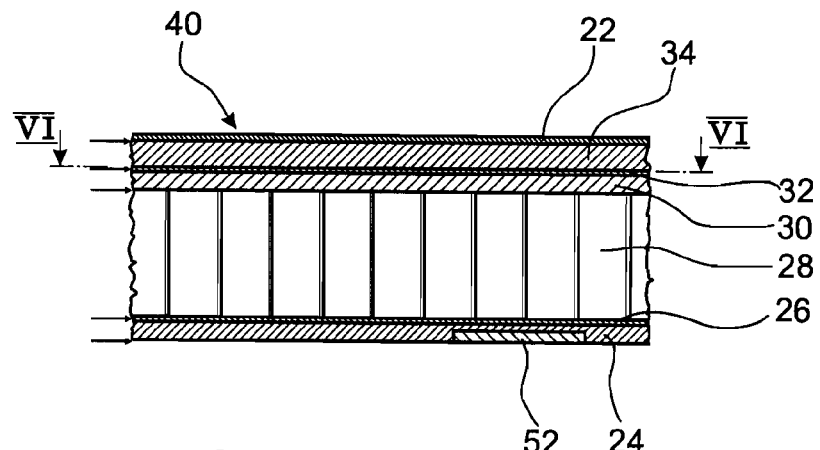
FIG. 5 shows a longitudinal section through a vehicle component with a multilayered construction of the supporting layers.

The vehicle 10 shown in FIG. 1 has a roof module 12 adjoining the front windshield 14. This roof module 12, as well as the vehicle doors 60, roof posts 70, A pillars 80, B pillars 82 and C pillars 84 that are likewise indicated in FIG. 1, are examples of vehicle components 40 of which the outer skin forms the outer surface of the vehicle. However, the invention can also be used advantageously for other vehicle components 40, such as for example wings, engine compartment covers, luggage compartment covers, rear-end modules, roof shells of cabriolet hoods, front or rear spoilers.

In the sections according to FIGS. 2 to 4, a first exemplary embodiment of a vehicle component 40 according to the invention is represented on the basis of the roof module 12. The roof module 12 is fastened to a roof frame 16 by means of an adhesive bead 20. For this purpose, the roof frame 16 has corresponding flange regions 18.

As can best be seen from FIG. 5, the layered construction of the roof module 12 is formed, from the inside outward, by a first supporting layer 24, a splinter protection fabric 26, a core layer 28, formed as a honeycomb structure, a second supporting layer 30, a splinter protection fabric 32, a decoupling layer 34 and an outer skin 22.

The supporting layers 24 and 30 preferably consist of polyurethane (PU) with a basis weight of approximately 300 g to 500 g per square meter, which is optionally and preferably respectively reinforced by means of a glass fiber mat with a basis weight of approximately 200 g to 500 g per square meter. The thickness of the supporting layers 24 and 30 is preferably approximately 0.2 mm to 1.5 mm.

The core layer 28 preferably consists of a paper honeycomb, with a thickness (height) of approximately 5 mm to approximately 55 mm. As an alternative to this, the core layer may also consist of a plastics foam, a metal foam (for example aluminum foam) or a compact, lightweight and stable core material.

The decoupling layer 34 preferably has a thickness of approximately 0.5 mm to 4 mm, particularly preferably of approximately 2 mm to approximately 2.5 mm. It serves the purpose of effectively preventing the honeycomb structure from being pressed through visibly on the outer skin 22, as could otherwise occur during pressing together in a mold in the absence of the decoupling layer 34.

The layered construction described up to this point, comprising the core layer 28 and the two adjacent supporting layers 24 and 30, is preferably produced by means of the composite spray molding process (CSM process: known from the company Hennecke GmbH, D-53754 Sankt Augustin) in a mold (CSM mold). It is already represented in a similar form in DE 100 33 232 C2, originating from the same applicant. The strength, together with very low weight, is in that case achieved particularly by means of the plastic (PU) penetrating into the region of the vertical walls of the honeycombs and bonding with them.

The outer skin 22 is preferably created by spraying a layer of paint or a layer of primer and paint in a layer thickness of 0.03 to 0.06 mm or from a thermosetting plastic, such as for example unsaturated polyester (UP), in a layer thickness of 0.3 to 0.6 mm by the in-mold coating process (IMC process) directly in the CSM mold.

In the edge regions, the roof module 12 is pressed more strongly in the mold. Here, the core layer 28 is also omitted and the free space produced is provided from below with a supporting layer 50, which increases the stability of the vehicle roof module 12 and is preferably produced from polyurethane with injected fiber material by spraying in the long fiber injection molding process (LFI-PUR process). After the vehicle roof module 12 has been fitted, these edge regions of increased strength are located in the flange regions of the roof frame 16, level with the adhesive beads 20.

According to the invention, at least one splinter protection fabric is embedded in the layered construction of the supporting layers 24, 30. In the exemplary embodiment according to FIG. 5, two splinter protection fabrics 26 and 32 are provided, of which the splinter protection fabric 26 is located between the first supporting layer 24 and the core layer 28, nearer the inner side of the vehicle roof module 12, and the second splinter protection fabric 32 is located between the second supporting layer 30 and the decoupling layer 34, nearer the outer skin 22 of the vehicle roof module 12. In the event of breaking of the vehicle roof module 12 caused by an accident, both splinter protection fabrics 26 and 32 prevent sharp-edged breaking of the adjacent supporting layers, both on the inner side and on the outer side, so that both the occupants of the vehicle and those involved in the accident outside the vehicle are protected from injuries that would be caused by sharp broken edges.

Figure 6:
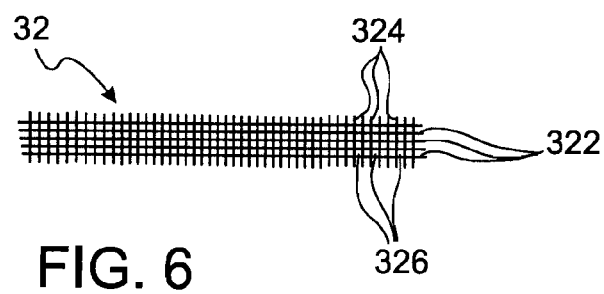
FIG. 6 shows a plan view of a splinter protection fabric along the line of section VI in FIG. 5.

In principle, other installation positions, which are indicated in FIG. 5 by small arrows at the left-hand edge of the vehicle component 40, come into consideration for the splinter protection fabrics 26 and 32, the form of which is represented in FIG. 6 on the basis of the splinter protection fabric 32. In this case, splinter protection fabrics may be arranged: between the outer skin 22 and the decoupling layer 34, embedded in the decoupling layer 34, between the decoupling layer 34 and the second supporting layer 30 (as already indicated in FIG. 5 by 32), between the second supporting layer 30 and the core layer 28, between the core layer 28 and the first supporting layer 24 (as already indicated in FIG. 5 by 26) or under the first supporting layer 24. In each case, it is advisable to arrange the splinter protection fabrics 26 and 32 as far to the outside as possible (for the protection of those involved in an accident outside the vehicle) and/or as far to the inside as possible (for the protection of the occupants of the vehicle).

The splinter protection fabric 32 shown by way of example in FIG. 6 consists of longitudinal threads 322 and transverse threads 324. Between the individual loops 326 there remain intermediate spaces, through which the plastics material of the adjacent supporting layers (in FIG. 5 of the layers 24 and 30) penetrates, and consequently enters into an intimate bond with the more elastic splinter protection fabric 32.

The overall thickness of the vehicle component 40 is between approximately 2 mm and approximately 60 mm. Depending on the required stability and load-bearing capacity of the vehicle component 40, the lower limit of the thickness of 2 mm comes into consideration for coverings that are subjected to relatively little loading, while the upper limit is relevant for relatively thick components, such as posts or vehicle pillars. The overall thickness of a roof module 12 lies in the middle range of approximately 20 mm.

On the inner side of the vehicle roof module 12 there may be embedded, for example, in the first supporting layer 24 inserts 52 made of metal, which serve for fastening adjacent components, such as for example sun visors or grab handles.

The invention claimed is:

1. A vehicle component made of plastic,
in particular a vehicle body shell component, such as a vehicle roof module, vehicle door, roof post, vehicle pillar, wing, engine compartment cover, luggage compartment cover, rear-end module, roof shells of cabriolet hoods, front or rear spoilers,
with at least one supporting layer,
with at least one outer skin,
and with at least one splinter protection layer,
wherein
the splinter protection layer is formed as a splinter protection fabric and
is embedded between two adjacent layers or in one of the supporting layers, in particular in the region thereof near the edge.

2. The vehicle component as claimed in claim 1, wherein the at least one supporting layer consists
of polyurethane (PU) or some other thermoset and/or
of a honeycomb layer or a foam layer of plastic or metal or a layer of some other core material and/or
of a glass fiber mat and/or
of a decoupling layer.

3. The vehicle component as claimed in claim 1, wherein the at least one supporting layer or at least one of a number of supporting layers is produced
- by the composite spray molding process (CSM process) and/or
- by the long fiber injection process (LFI process) and/or
- by the glass fiber mat polyurethane process (GM-PU process) and/or
- by the resin transfer molding process (RTM process) and/or
- by the sheet molding compound process (SMC process) and/or
- by the reaction injection molding process (RIM process) and/or
- by the reinforced reaction injection molding process (RRIM process) and/or
- by the injection molding process.

4. The vehicle component as claimed in claim 1, wherein the at least one splinter protection fabric consists
- of polyethylene (PE) and/or
- of polyethylene terephthalate (PET) and/or
- of polyamide (PA) and/or
- of polypropylene (PP) and/or
- of aramid and/or
- of elastic polyurethane (PU) and/or
- of natural or synthetic rubber and/or
- of a steel mesh.

5. The vehicle component as claimed in claim 1, wherein the supporting layers thereof consist, from the inside outward,
- of a first layer of polyurethane (PU),
- of a core layer created by honeycomb technology,
- of a second layer of polyurethane (PU),
- of a decoupling layer and
- of an outer skin,
- at least one splinter protection fabric being arranged
- between the first layer of polyurethane (PU) and the core layer
- and/or
- between the second layer of polyurethane (PU) and the core layer
- and/or
- between the second layer of polyurethane (PU) and the decoupling layer.

6. The vehicle component as claimed in claim 1, wherein a glass fiber mat is embedded as reinforcement in at least one of the supporting layers of polyurethane or some other thermoset.

7. The vehicle component as claimed in claim 1, wherein the outer skin is colored in the desired vehicle color.

8. The vehicle component as claimed in claim 1, wherein the vehicle component has an overall thickness of 2 mm to 60 mm.

* * * * *